United States Patent [19]

Maubray

[11] Patent Number: 5,283,925
[45] Date of Patent: Feb. 8, 1994

[54] WINDSHIELD WIPER AIR DEFLECTOR MOVABLE IN A SINGLE PLANE TO COMPENSATE FOR WINDSHIELD CURVATURE

[75] Inventor: Daniel Maubray, Issy-les-Moulineaux, France

[73] Assignee: Valeo Systemes d'Essuyage, Montigny-le-Bretonneux, France

[21] Appl. No.: 556,373

[22] Filed: Jul. 23, 1990

[30] Foreign Application Priority Data

Jul. 26, 1989 [FR] France .................. 89 10041

[51] Int. Cl.$^5$ .................................. B60S 1/04
[52] U.S. Cl. .................. 15/250.20; 15/250.42
[58] Field of Search ......... 15/250.20, 250.35, 250.36, 15/250.42, 250.41, 250.31

[56] References Cited

U.S. PATENT DOCUMENTS

| | | | |
|---|---|---|---|
| 2,794,203 | 6/1957 | Oishei | 15/250.20 |
| 2,799,887 | 7/1957 | Nemic | 15/250.20 |
| 4,561,143 | 12/1985 | Beneteau | 15/250.42 |
| 4,590,638 | 5/1986 | Beneteau | 15/250.20 |
| 4,984,325 | 1/1991 | Arai et al. | 15/250.2 |

FOREIGN PATENT DOCUMENTS

| | | | |
|---|---|---|---|
| 0239201 | 9/1987 | European Pat. Off. | |
| 0280149 | 8/1988 | European Pat. Off. | 15/250.35 |
| 3829465 | 3/1990 | Fed. Rep. of Germany | 15/250.35 |
| 2513952 | 4/1983 | France | |
| 2621288 | 4/1989 | France | |
| 939404 | 10/1963 | United Kingdom | 15/250.42 |
| 1105704 | 3/1968 | United Kingdom | 15/250.42 |
| 2145928 | 4/1985 | United Kingdom | |

*Primary Examiner*—Stephen F. Gerrity
*Assistant Examiner*—Gary K. Graham
*Attorney, Agent, or Firm*—Dennison, Meserole, Pollack & Scheiner

[57] ABSTRACT

A windshield wiper apparatus comprises an arm carrying a blade. The latter comprises a mounting member carrying a wiping strip, the apparatus being adapted to be fitted with an air deflector. In accordance with the invention, the air deflector is carried by the arm or the blade, through at least two articulations. The invention is especially applicable to automotive vehicles.

11 Claims, 2 Drawing Sheets

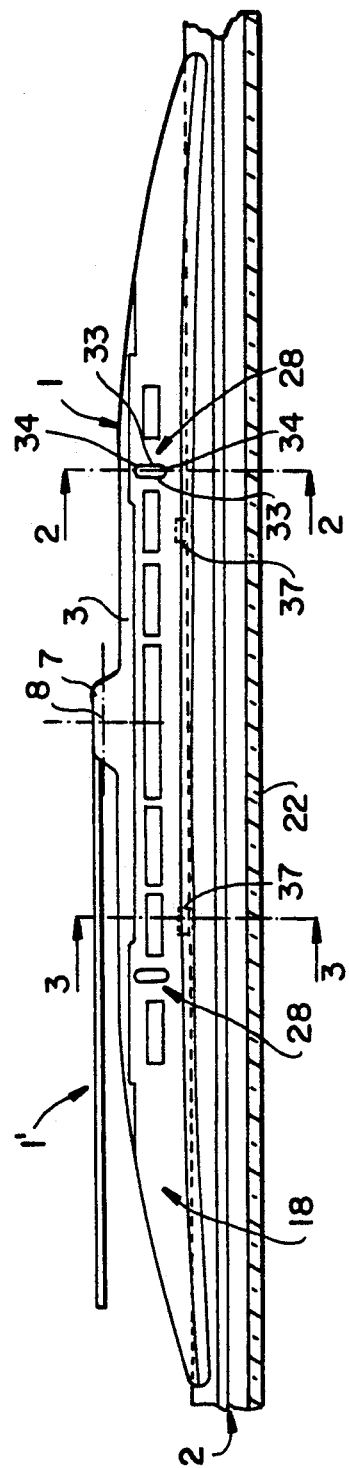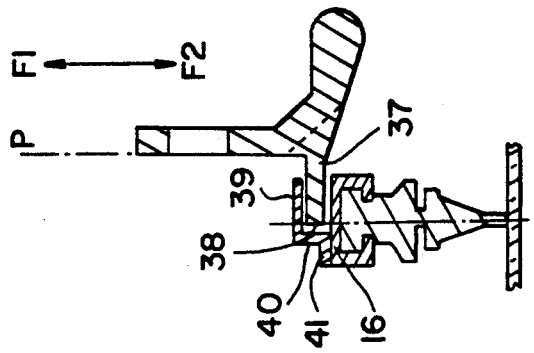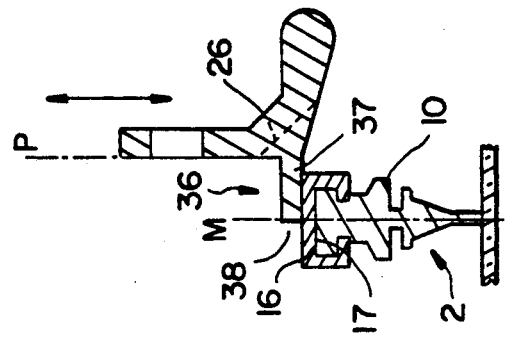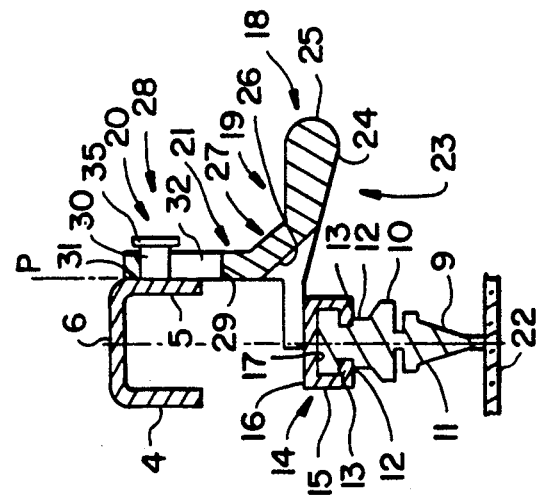

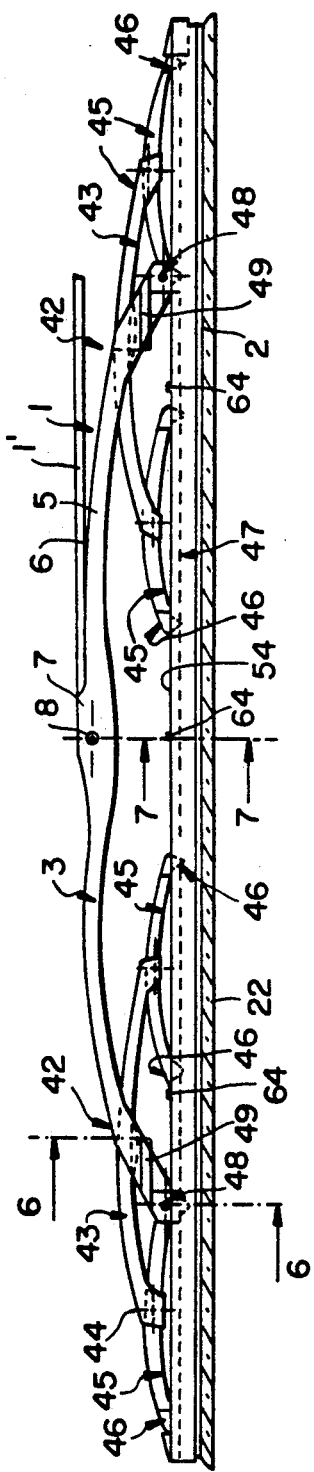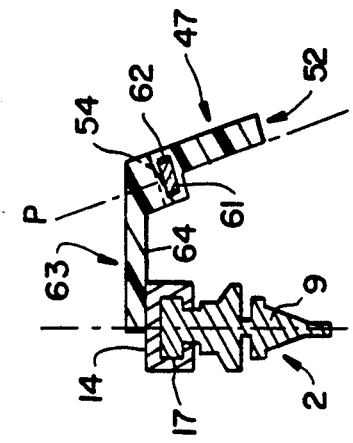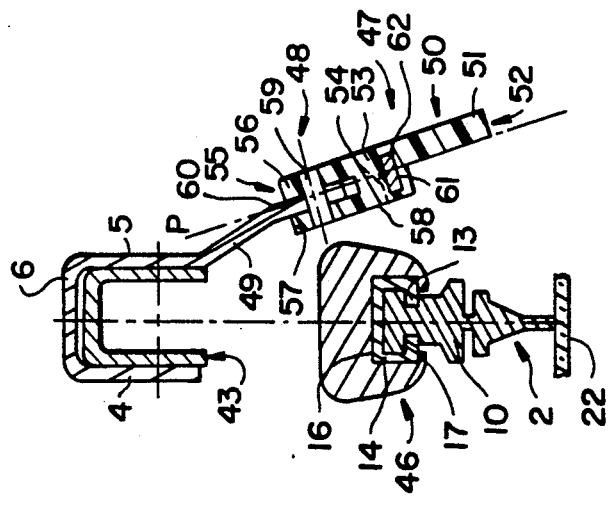

1

WINDSHIELD WIPER AIR DEFLECTOR MOVABLE IN A SINGLE PLANE TO COMPENSATE FOR WINDSHIELD CURVATURE

FIELD OF THE INVENTION

The present invention relates to a movable air deflector for a windshield wiper apparatus, in particular for automotive vehicles, and to such apparatus having such a deflector.

BACKGROUND OF THE INVENTION

A windshield wiper blade conventionally comprises a mounting member consisting of at least one stirrup which is adapted to hold a wiping strip, which is generally made of rubber based material. It has been found that, in operation and when the vehicle in which the wiper is incorporated is travelling at high speed, the air flow acting on the wiper blade sets up a force which tends to lift the blade; and in extreme conditions this force can cause the blade to separate from the surface being swept, thus impairing the quality of the wiping action on the swept surface.

It has been proposed, in particular in the specification of French published patent application No. FR 2 513 952A, to provide air deflectors which are arranged parallel and at a suitable spacing from the wiping strip, the said deflectors including, or being arranged to extend from, a resilient bar which is carried by the wiping strip, in such a way as to divert the air flow away from the working zone of the wiping strip.

Although this deflector arrangement does partly overcome the problem of air flow setting up a lifting force, it does still reduce the quality of the wiping action performed by the wiping strip. What happens is that the deflector and the resilient bar tend to cause the wiping strip to become more rigid, and, in the case of a swept surface having a large curvature, for example windshields of automotive vehicles, the wiping strip is unable to hug this curvature accurately. The result is that during operation on certain parts of the windshield, its surface is not wiped, with the inevitable result that the driver's visibility is impaired.

In addition, this type of air deflector can, in the case in which the air flow penetrates between the wiping strip and the deflector, cause separation of the whole wiper blade, due to the creation of a lifting force on the face of the deflector which lies facing that of the wiping strip.

DISCUSSION OF THE INVENTION

An object of the present invention is to overcome the disadvantages discussed above, while providing a deflector for a windshield wiper that is of very simple design, such as to enable correct wiping of the swept surface to be ensured.

In accordance with the invention, an air deflector for a windshield wiper apparatus comprising two elements, one of the said elements being a windshield wiper arm carrying the other of the said elements which comprises a windshield wiper blade that includes a mounting member carrying a wiping strip, is characterised in that the deflector is carried on one of the said elements by means of at least two articulations, in such a way as to enable it to be displaced in its plane.

Due to this arrangement, the air deflector is able to be displaced with respect to the assembly comprising the mounting member and the wiping strip which it carries, without having any effect on the latter, but yet ensuring that the air flow will at all times be diverted away from the wiping strip.

According to a preferred feature of the invention, the articulations are articulations of two elements in mutual cooperation.

In accordance with a further preferred feature of the invention, one of the said members is a member defining an axis and the other of the said members is an opening.

In accordance with yet another preferred feature of the invention, the articulations serve at the same time as means for attaching the deflector on one of the said elements.

By virtue of these and other features, the articulations enable the deflector to move freely.

In accordance with a further preferred feature of the invention, the articulations are situated on tabs carried by one of the said elements.

In accordance with yet another preferred feature of the invention, the articulations are articulations arranged for translational movement.

In accordance with yet another preferred feature of the invention, the articulations comprise an oblong through opening carried by the deflector and cooperating with a pin carried by one of the said elements.

In accordance with yet another preferred feature of the invention, the articulations are articulations arranged for rotational movement.

Due to these various arrangements, the air deflector is able not only to follow the curvature of the swept surface, by being controlled directly by the wiping strip itself, which is free of any obstacle, but it also allows the deflector, in the event of penetration of the air flow between the wiping strip and the deflector itself, to be able to displaced without displacing the wiping strip with it. This enables the swept surface to be wiped efficiently.

Further features and advantages of the invention will appear more clearly from the description which follows, and which is given by way of example and with reference to the accompanying drawings.

BRIEF DESCRIPTION OF THE DRAWINGS

FIG. 1 is a front view showing a windshield wiper blade provided with a deflector in accordance with the invention.

FIG. 2 is a view in cross section taken on the line 2—2 in FIG. 1.

FIG. 3 is a view in cross section taken on the line 3—3 in FIG. 1.

FIG. 4 shows a variant on the arrangement shown in FIG. 3.

FIG. 5 shows a further variant in the deflector in accordance with the invention.

FIG. 6 is a view in partial cross section, taken on the line 6—6 in FIG. 5.

FIG. 7 is a view in partial cross section, taken on the line 7—7 in FIG. 5.

DESCRIPTION OF PREFERRED EMBODIMENTS OF THE INVENTION

Referring first to FIGS. 1 and 2, a windshield wiper blade includes a mounting member 1 carrying a wiping strip 2. The mounting member 1 comprises, in this example, a main stirrup 3, which is elongated and slightly curved, and which has a U-shaped cross section with flanks 4 and 5, the latter being substantially parallel to each other and perpendicular to the central web 6 of the U, as is best seen in FIG. 2.

In a manner known per se, the central web 6 of the main stirrup 3 has an opening (not shown), which is delimited laterally by two wing elements 7, which constitute substantially extensions of the flanks 4 and 5, with these wing elements 7 being connected together by means of a pivot pin 8. The opening in the central web and the pivot pin 8 allows the mounting member to be mounted on a female articulation member of a known type, which is carried on the end of a windshield wiper arm 1'.

The wiping strip 2, carried by the mounting member 1, has a wiping lip 9 which is joined to a base portion 10 through a hinge portion 11. At the level of its middle portion, the base portion 10 has two longitudinal grooves 12 which are adapted to receive the ends of claws 13 of a resilient bar 14. This resilient bar is of a generally rectangular, hollow, cross section, and has two vertical flanks 15. The latter have the claws 13 arranged at one end and are connected to each other at their other end, through a transverse wall portion 16 which bears on the back 17 of the strip 2. The back 17 is at the opposite side of the strip from the wiping lip 9.

The resilient bar 14 may of course be replaced in a known manner by a blade member which may for example be of metal, and which is disposed in each groove 12 so as to extend along the latter while leaving the back 17 of the strip 2 free.

In order to facilitate understanding of the remainder of this description, reference will merely be made to a wiping strip, the latter being able to carry either a resilient bar, or strips arranged in the grooves of the base portion of the wiping strip.

The wiper blade is provided with an air deflector 18 which in the example shown is carried by the blade, though in a modification the deflector may be carried by the windshield wiper arm. Accordingly, although the remainder of this description relates to one particular type of air deflector, the invention is applicable to any other type of deflector. The type of deflector which is used by way of example in the description of the invention with reference to FIGS. 1 to 4 is described in greater detail in French published patent application No. FR 2 621 288A, and will not be further described here except in general terms.

Referring now further to FIG. 2, the deflector 18 has a profiled portion 19, attachment means 20, and connecting means 21. In this example the attachment means secure the deflector to the mounting member 1, while the connecting means 21 connect the profiled portion 19 with the attachment means 20, and extend towards the surface, indicated at 22, which is to be swept by the wiper blade. Typically this is the surface of a windshield of an automotive vehicle.

The profiled portion 19 is substantially convex in shape towards the swept surface 22. This profiled portion includes on its inner surface 23 a first zone 24 which is substantially flat and which is inclined at a certain angle with respect to the swept surface 22. The zone 24 extends from a leading edge 25 rearwardly, that is to say towards the mounting member 1. The leading edge 25 is rounded and has a substantially semi-cylindrical shape. A second zone 26 follows the first zone 24, making an angle with respect to the swept surface which is greater than the angle made by the first zone 24, such that the profile of the inner surface of the profiled portion 19 is generally V-shaped, convex towards the swept surface 22.

The outer surface 27 of the profiled portion 19 is generally V-shaped and concave, with the thickness of the said profiled portion reducing progressively from the leading edge 25 towards the blade. The profiled portion 19 is spaced away from the swept surface 22, and is more fully described in the above mentioned patent application.

In this example, the connecting means 21 comprise a solid web which connects the inner end of the profiled portion 19, delimited by the zone 26, to the attachment means 20. The web 21 extends along the whole length of the profiled portion 19 so as to constitute the attachment means 20 itself. Preferably, the profiled portion 19 and the web constituting the connecting means 21 are formed in plastics material and in a single piece.

As is best seen in FIGS. 1 and 2, the deflector 18 is carried, here on the mounting member 1 itself, through at least two articulations 28. The articulations 28 also, in this example, serve as the means for attachment of the deflector. The latter is mounted for articulation by translational movement, in such a way as to allow it to be fully displaced in a common plane P passing through one of its faces, which in this example is the rear face 29 of the web 21.

To this end, the translational articulation 28 comprises a pin 30 which projects, orthogonally in this example, from the outer face 31 of the flank 5 of the stirrup portion 3, together with an opening 32 which extends through the web 21 of the deflector 18. This opening 32 is a slot, oblong in shape and having parallel sides 33 and rounded ends 34. It extends in a direction corresponding to the direction in which the deflector is required to be displaced in translation. This may be any suitable direction, and in the case illustrated in FIG. 1 it corresponds to a direction which is orthogonal to the swept surface 22.

The pin 30 has at its free end a head 35, the diameter of which is greater than the width of the slot 32 which is itself slightly greater than the diameter of the pin 30, in such a way as to facilitate the displacement of the deflector 18.

The deflector 18 is thus attached to the mounting member 1 by virtue of its web 21 being trapped between the outer face 31 of the flank 5 and the inner face of the head 35, the distance between these respective inner and outer faces being greater than the thickness of the web 21, so as to permit the movement of the deflector.

Reference is now also made to FIG. 3. The deflector 18 has displacement control means 36, the function of which will become clear from the remainder of this description. These displacement control means comprise at least one rigid finger 37 projecting from the zone 26 of the deflector. The fingers 37 engage on the wiping strip 2, and in this example on the outer face of the transverse wall portion 16 of the resilient bar 14, or, as mentioned earlier herein, directly on the back 17 of the base portion 10 of the wiping strip 2. In practice the fingers 37 spring from the zone 26 and are disposed substantially horizontally with their free ends 38 lying generally beyond the median plane M of the strip 2. In FIG. 1, two control fingers 37 are shown, but a single control finger would suffice, being then disposed in a region about half way along the wiping strip 2. Also, it is arranged in practice that the deflector 18 and the fingers 37 are all moulded in a single piece.

Referring now to FIG. 4, it should be noted that the free end 38 of each control finger 37 is disposed, with a clearance, between the outer face of the wall portion 16 of the resilient bar 14 and the inner face of a wall 39 which lies at a distance from the wall portion 16 and parallel to it. The wall 39 is connected to the wall portion 16 through a web 40 which is carried by a foot 41, fixed to the outer face of the wall portion 16, by any appropriate means such as by adhesion for example. In consequence, the control finger is able to be actuated either by the outer face of the wall portion 16 in a first direction F1, or by the inner face of the wall 39 in a second direction F2.

This arrangement is of particular advantage in that it allows the deflector 18 to follow the wiper blade itself if, as mentioned above, a lifting force is set up on the face of the deflector located facing towards the wiping strip 2.

The purpose and operation of the deflector 18 has been explained with reference to FIG. 1, which shows the assembly of the wiper blade and the deflector in engagement on a flat swept surface 22.

In the case in which the swept surface 22 is a surface having a high curvature, the wiping strip 2 hugs this curvature, assuming an incurved shape in which the zone situated in the middle of the length of the wiping strip tends to move towards the main stirrup portion 3, while the ends of the wiping strip tend to move further away from the main stirrup. During this movement, the wiping strip 2 acts, in this example, through the back 17 of its base portion 10 or through the bar 14, on the control fingers 37 carried by the air deflector 18. The fingers 37 drive the deflector 18 in translational displacement by sliding along the plane P of the inner face 29 of the web 21, on the outer face 31 of the flank 5 of the stirrup portion 3, while being guided and coupled with the stirrup portion by the slot 32 sliding on the pin 30, with the head 35 of the latter preventing any escape from the slot 32.

The deflector is thus enabled to have a displacement towards the slot 32, in both directions represented in the drawings by the arrows F1 and F2. This arrangement thus permits the preservation of a spacing, considered at the level of the median zone of the wiping strip 2, between the edge 25 of the deflector and the swept surface 22, this spacing being substantially identical whatever curvature the swept surface may have.

Reference is now made to FIGS. 5, 6 and 7 which show another embodiment of the deflector in accordance with the invention. In the examples shown in these Figures, the mounting member 1 comprises a main stirrup 3 having ends 42, with intermediate stirrups 43, substantially identical in shape to the main stirrup, that is to say elongated, curved and of U section, being disposed at the ends 42.

The intermediate stirrups 43 are of U section, and are so dimensioned that, at least in their central part, this last mentioned section is retained and received in the U-shaped section of the main stirrup 3, in such a way as to allow each of the intermediate stirrups 43 to be pivotally articulated with respect to the main stirrup 3 in a known manner.

Each intermediate stirrup 43 carries a secondary stirrup 45 at each of its two ends 44. The secondary stirrups are again elongated and curved, and have at each of their ends gripping jaws 46 for holding the wiping strip 2. The wiping strip 2 has the same configuration as that already described, and is designated by the same reference numerals. The only difference lies in the fact that the gripping jaws 46 have been shown, with the latter enclosing the bar 14 down to the level of the jaws 13 of this bar.

In the drawings, the jaws 46 are in engagement on the outer face of the wall portion 16, but as mentioned above, it can be arranged that these jaws engage directly on the back 17 of the wiping strip 2, which in that case includes strips (not shown) in the grooves 12 as already mentioned.

An air deflector 47 is arranged in the vicinity of the wiping strip 2 and extends parallel to the latter. As is seen best in FIG. 5, the deflector 47 is mounted for articulation on the mounting member 1 at two pivots 48.

In practice, each pivot 48, serving for articulating the air deflector 47, is carried by a tab 49 which projects from the main stirrup 3, and more particularly from one of its flanks 5, with the tab facing towards the wiping strip 2.

Referring to FIG. 6, and in order to illustrate the fact that the invention is applicable to any type of deflector, the deflector 47 is here provided with a body 50 of soft, deformable material, extending in a longitudinal direction which is substantially parallel to the wiping strip 2 and which defines a plane P which passes through the middle part of the body 50 and the pivot points 48. The plane P is inclined at an angle which is not zero, and which in this example is about 20 degrees, with the general mean plane passing through the mounting member and the wiper blade. The body 50 has an L-shaped cross section which is arranged in back-to-back relationship with a conventional L-shaped portion, with the more nearly vertical portion of the L, here denoted by the reference numeral 51, having a free edge 52 of the deflector, while the more nearly horizontal portion of the L, indicated at 53, includes the inner edge 54 of the air deflector 47, the edge 54 being substantially parallel to the edge 52 of the portion 51.

From the inner edge 54, there extends a connecting element 55 for connection with the tab 49 carried by the main stirrup 3, whereby the deflector 47 can pivot on the tabs 49 about the pivot points 48 described above. To this end, the connecting element 55 comprises two projecting portions 56 and 57, which spring from the inner edge 54 towards the main stirrup 3 and in a transverse extension of the general direction in which the body 50 extends. The portions 56 and 57 are arranged parallel to each other, but spaced from each other so as to create a free space 58, open at the end directed towards the stirrup, in such a way as to receive the free end of the tab 49.

As can best be seen from FIG. 6, it is at the level of the junction between the tab 49, in the free space 58 between the two projecting portions 56 and 57, that the rotational articulation of the deflector takes place. For this purpose, the projecting portions 56 and 57 carry a cylindrical pivot pin 59 which extends orthogonally through the two projecting portions and the free space 58. The pivot pin 59 is received in an opening 60, having a radius larger than that of the pivot pin 59 so as to allow the latter to move relative to the tab 49. The opening 60 is arranged in the vicinity of the free end of the tab 49, while being situated in the free space 58.

In addition, the body 50 of the deflector 47 includes a strip 61, which in this example lies in the portion 53 described above. This strip 61 has a rectangular cross section, the larger dimension of which lies parallel to the inner edge 54. The strip 61 is mounted with a clearance in an opening 62 formed in the portion 53, with the opening 62 extending longitudinally along the whole length of the portion 53 of the wiping strip 2.

Referring now to FIG. 7, the deflector 47 again has displacement control means 63. These again consist of at least one rigid finger 64 projecting from the inner edge of the deflector, with these fingers engaging on the wiping strip 2. Thus, when the blade 1, carrying its deflector 47, is being mounted in position, the strip 2 hugs the curvature of the windshield 22 and exerts a force on the fingers 64.

The fingers 64 drive the deflector in a displacement such that the edge 52 of the deflector can move away when its edge 53 is contracted, so giving a curved configuration to the deflector by displacement of its body in the plane P passing through the two pivot points 48, and by partial rotation about these pivot points. This is made possible due to the twin facts that the fingers 64 are separate from the wiping strip 2, and that the fingers are able to slide in a substantially horizontal manner on the back of the wiping strip. This action on the fingers 64 produces a curvature in the deflector 47 so that it takes up the same curvature as the wiping strip 2. This is achieved by rotation of the pivot pins 59, carried by the projecting portions 56 and 57 connected to the deflector, and mounted in the openings 60 of the tabs 49 of the main stirrup 3.

In addition, the strip 61 acts to spread the displacement, in the direction in which, during the action of the wiping strip 2 on the fingers 64, the said strip becomes curved at the location of the fingers, thus setting up a uniform distribution of the displacement of the deflector between the two pivot points 48; and also, by reaction, causing displacement of the free end of the deflector to take place in the opposite direction.

The present invention is not limited to the embodiments described, but embraces all modifications. In particular, the tab 49 projecting from the main stirrup 3 may be an attached member which is adapted to be supported by the main stirrup, being for example clipped on the outer surface of the latter, with this fixed or removable tab being arranged to carry, if necessary, the pin 30 mentioned above.

In addition, it can be arranged that the articulation points 28 and 48 may be used one after the other. More precisely, it can be arranged that after an initial translational movement of the deflector as a whole, and if necessary, the translational articulations can then be transformed into rotational or pivotal articulations, for example by abutment of the slots 32 on the pins 30 in such a way that the deflector can pivot about the pins 30, which thus act like the pivot pins 59 described above.

What is claimed is:

1. A windshield wiper assembly comprising a driving wiper arm (1'), an elongated main stirrup (3) driven by said wiper arm, an elongated wiping strip (2) having a longitudinal plane of symmetry (M) which defines two sides of said strip, support means connecting said wiper strip to said main stirrup, an air deflector (47) spaced from and extending substantially coextensively with said wiping strip to one side thereof, portions of said air deflector defining a longitudinal plane (P) which extends at an angle with respect to the plane of symmetry (M) of said wiper strip, means (59) for mounting said air deflector on said main stirrup, said means for mounting comprising plural spaced pivotal connection means between said main stirrup and said air deflector to enable motion between said air deflector relative to said main stirrup in said longitudinal plane (P).

2. Apparatus according to claim 1 wherein said means for mounting comprises two spaced pivotal connecting means, each pivotal connection means comprising a pin connected to said main stirrup, an elongated slot in said deflector, said pin passing through said slot whereby said deflector moves in said plane (P) as constrained by said slot.

3. Apparatus according to claim 2 including at least one finger projecting from said air deflector, said at least one finger overlying and contacting said wiper strip whereby flexing motion of said wiping strip effects motion of said air deflector.

4. Apparatus according to claim 1 wherein said means for mounting comprises two spaced pivotal connection means, each pivotal connection means comprising a tab connected to said main stirrup, an air deflector connecting element joined to said air deflector and having an open slot, said tab projecting into said slot, said tab having an opening, a pin passing through said connecting element and said tab opening enabling pivotal motion of said air deflector with respect to said main stirrup.

5. The apparatus as claimed in claim 4 wherein said air deflector is formed of soft deformable material with a longitudinal rectangular stiffening element encased therein.

6. Apparatus as claimed in claim 5 including at least one finger projecting from said air deflector, said at least one finger overlying and contacting said wiper strip whereby flexing motion of said wiping strip effects flexing motion of said air deflector around said pivotal connections.

7. A windshield wiper assembly comprising a driving wiper arm, an elongated main stirrup connected to and driven by said wiper arm, said stirrup having front and rear sides, a wiping strip operative over a windshield surface, support means connecting said wiper strip to said main stirrup, an air deflector mounted on said main stirrup and extending substantially coextensively therewith and to one said side thereof, said air deflector comprising a profiled portion convex in shape facing said wiping strip and a planar connecting means, said planar connecting means abutting said main stirrup and secured thereto by pivot means, said pivot means retaining said planar connecting means in abutting relation with said main stirrup while permitting planar sliding motion of said deflector toward and away from said windshield; and means coupling said air deflector to said wiping strip to effect said planar sliding motion.

8. The apparatus as claimed in claim 7 wherein said pivot means comprise two spaced pivot connections.

9. The apparatus as claimed in claim 8 wherein each pivot connection comprises a pin fixed to said main stirrup and an elongated opening in said planar connecting means, said pin extending through said elongated opening and having an enlarged head retaining said planar connecting means in planar sliding relation with said main stirrup.

10. Apparatus according to claim 7 wherein said means coupling said air deflector to said wiping strip comprises a rigid control finger extending from said profiled portion to a position overlaying said wiper strip.

11. The apparatus as claimed in claim 10 including a wall member secured to said wiping strip but spaced therefrom to provide an opening to capture said control finger thereby providing controlled up and down sliding motion of said air deflector.

* * * * *